May 18, 1948.    J. A. MORRONE    2,441,670
ANTISKID DEVICE FOR VEHICLE TIRES
Filed Feb. 28, 1947    2 Sheets-Sheet 1
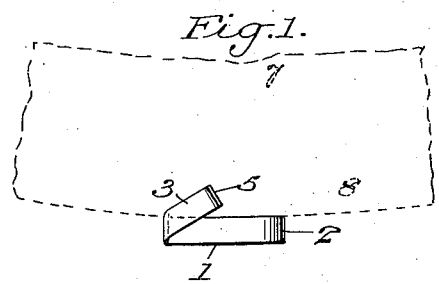
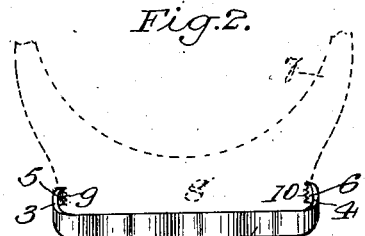
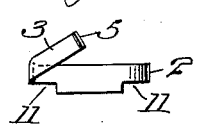
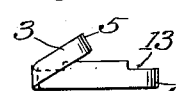
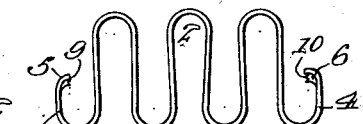
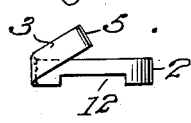
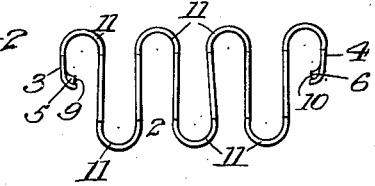
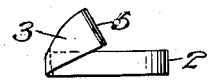
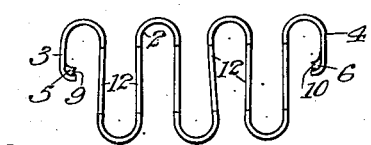
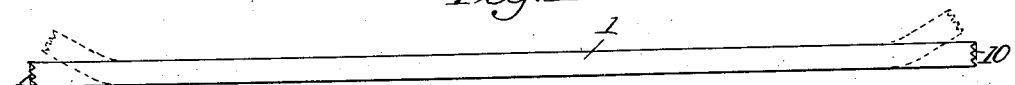
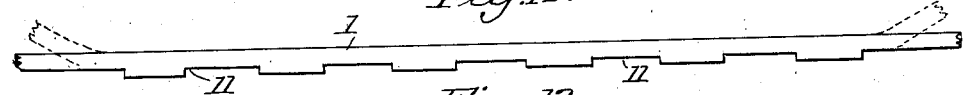
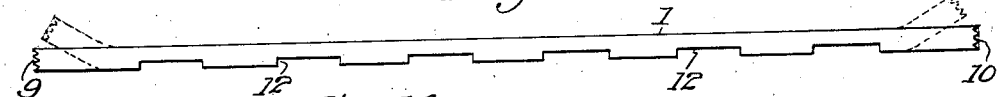
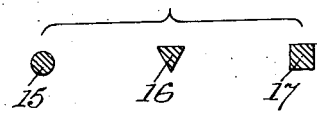
INVENTOR
BY
ATTORNEYS May 18, 1948.  J. A. MORRONE  2,441,670
ANTISKID DEVICE FOR VEHICLE TIRES
Filed Feb. 28, 1947    2 Sheets-Sheet 2

INVENTOR
Joseph A. Morrone
BY
ATTORNEYS

Patented May 18, 1948

2,441,670

UNITED STATES PATENT OFFICE 2,441,670

ANTISKID DEVICE FOR VEHICLE TIRES

Joseph A. Morrone, Westerly, R. I., assignor to Morrone Manufacturing Co., Westerly, R. I., a corporation of Rhode Island Application February 28, 1947, Serial No. 731,531

12 Claims. (Cl. 152—225)

The object of my invention is to provide a novel, effective and inexpensive anti-skid device for vehicle tires, which device may be readily attached directly to and detached from the tire, thereby eliminating the necessity of providing additional elements for securing the anti-skid device in position.

My invention comprises broadly an anti-skid device for removable attachment directly to a vehicle tire in any desired position around the tire, said anti-skid device comprising an intermediate elastic portion stretchable across the tread of the tire and provided with means for engaging the tire on opposite sides of its tread.

My invention also comprises a resilient bar of the desired shape in cross section, said bar being developed into a looped portion to be stretched across the tire tread, the looped portion having inclined end portions terminating in inwardly directed ends arranged in position to engage the tire on opposite sides of the tire tread, the said ends being preferably provided with teeth adapted to bite into the tire to prevent the unintentional creeping or removal of the anti-skid device.

My invention also contemplates the widening of the ends to provide extended elements for engagement of the tire.

Practical embodiments of my invention are represented in the accompanying drawings, in which Fig. 1 represents an end view of the anti-skid device when attached to a pneumatic tire, a portion of the tire being shown in dotted lines; the flat bar from which the anti-skid device is made being shown of oblong rectangular shape in cross section;

Fig. 2 represents a side view of the same;

Fig. 3 represents an end view of the anti-skid device in which the ends of the loops are recessed along their outer or traction edges;

Fig. 4 represents an end view of the anti-skid device in which the ends of the loops are recessed along their inner or tire tread engaging edges;

Fig. 5 represents a similar view in which the intermediate portions of the loops are recessed along their outer or traction edges;

Fig. 6 represents a similar view in which the intermediate portion of the loops are recessed along their inner or tire tread engaging edges;

Fig. 7 represents an end view of the anti-skid device in which the inwardly turned ends are widened to permit a more extended engagement with the tire;

Fig. 8 represents a bottom plan view of the anti-skid device shown in Figs. 1 and 2;

Fig. 9 represents a similar view of the anti-skid device shown in Fig. 3;

Fig. 10 represents a similar view of the anti-skid device shown in Fig. 5;

Fig. 11 represents a side view of the resilient flat bar from which the anti-skid device shown in Figs. 1, 2 and 8 is formed;

Fig. 12 represents a side view of the resilient bar from which the anti-skid device shown in Figs. 3 and 9 is formed;

Fig. 13 represents a side view of the resilient bar from which the anti-skid device shown in Figs. 5 and 10 is formed;

Fig. 14 represents three of the many cross sectional shapes in which the resilient bar, from which the anti-skid device is formed, may have;

Figure 15:
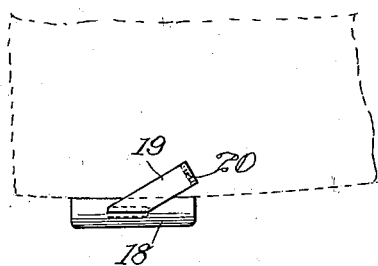
Fig. 15 represents an end view of another form of anti-skid device which comprises an intermediate portion of elastic material, as rubber, provided at its ends with resilient means for removably engaging the tire, a portion of the tire being shown in dotted lines.

In Figs. 1 to 14 inclusive the resilient bar 1 may be of any desired cross sectional shape and of any suitable material. This bar may also be of any desired length to suit tires of widely varying cross sectional diameters.

This resilient bar 1 is developed into a looped portion 2 having inclined end portions 3 and 4 terminating in inwardly directed ends 5 and 6 for engagement with the tire 7, shown in dotted outline, on opposite sides of the tire tread 8. These ends 5 and 6 may be provided with teeth 9 and 10 for biting into the tire on opposite sides of its tread when the looped portion 2 is stretched across the tread into its operative position.

It will be noted that these ends 5 and 6 are turned inwardly substantially in the plane of the inclined end portions 3 and 4 so that the teeth 9 and 10 will be at an angle to the circumference of the tire, thereby reducing the tendency of the anti-skid device to creep along the tire and thus cause the teeth to cut the same.

In Figs. 3 and 9 recesses 11 are shown cut in the outer or traction edges of the loops at their ends, and in Figs. 5 and 10 recesses 12 are shown cut in the outer or traction edges of the loops intermediate their ends. These recesses in both instances serve to add traction to the anti-skid device.

In Fig. 4 recesses 13 are cut in the inner or tire tread engaging edges of the loops at their ends, and in Fig. 6 recesses 14 are cut in the inner or tire tread engaging edges of the loops intermediate their ends. These recesses in both instances serve to form spaces on the tire side of the anti-skid device to prevent overheating of the device and the tire.

While I have shown the anti-skid device as formed from a flat bar of resilient material of oblong rectangular shape in cross section, it will be obvious that the bar may be made of many different shapes in cross section. In Fig. 14 I have shown as examples a round bar 15, a triangular bar 16 and a square bar 17. It will also be observed that the inwardly turned ends 5 of the inclined end portions 3 may be widened to provide more extended engagements with the tire upon opposite sides of the tire tread. One of these widened ends is shown in Fig. 7.

Figure 16:
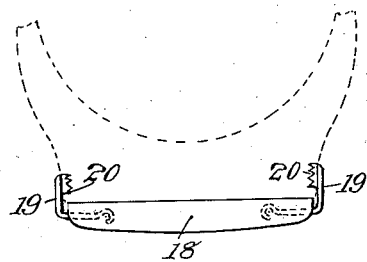
Fig. 16 represents a side view of the same.

In Figs. 15 and 16 the intermediate portion 18 is shown as an elastic solid material, as rubber, provided with inclined resilient end portions 19 permanently united therewith and having inwardly turned ends 20 for removably engaging the tire on opposite sides of its tread.

Figure 17:
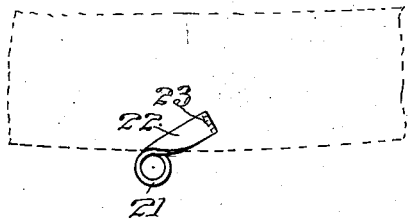
Fig. 17 represents an end view of another form of anti-skid device which comprises an intermediate spiral spring of ribbon material having its ends developed with means for removably engaging the tire, a portion of the tire being shown in dotted lines.
Figure 18:
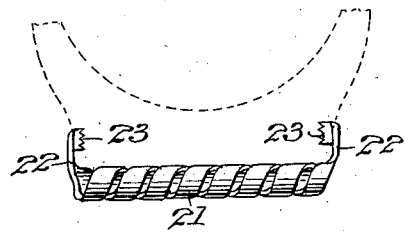
Fig. 18 represents a side view of the same.

In Figs. 17 and 18 the intermediate portion 21 is shown as a spiral spring of ribbon material having its inclined end portions 22 with inwardly turned ends 23 for removably engaging the tire on opposite sides of its tread.

Figure 19:
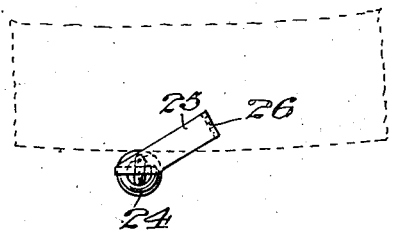
Fig. 19 represents an end view of another form of anti-skid device which comprises an intermediate spiral spring of round wire having secured to its ends means for removably engaging the tire, a portion of the tire being shown in dotted lines.
Figure 20:
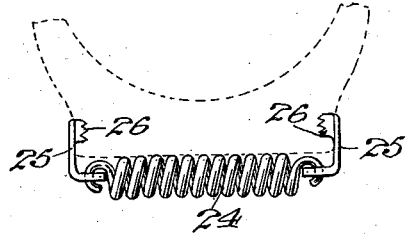
Fig. 20 represents a side view of the same.

In Figs. 19 and 20 the intermediate portion 24 is shown as a spiral spring of round wire provided with separate end portions 25 having inwardly turned ends 26 for removably engaging the tire on opposite sides of its tread.

The embodiments shown in Figs. 15 to 20 inclusive and described but not specifically claimed herein form the subject matter of my two divisional applications filed on the 23d day of October, 1947, their Serial Nos. being 781,685 and 781,686, respectively.

In actual practice, as many anti-skid devices may be attached to the tire as desired. It will be seen from the above description that an anti-skid device is provided which may be readily attached to and removed from the tire. It will also be observed that no additional elements are required to attach the anti-skid device to the tire.

It is evident that various changes may be resorted to in the construction, form and arrangement of the several parts without departing from the spirit and scope of my invention, and hence I do not intend to be limited to the particular embodiments herein shown and described, but what I claim is:

1. An anti-skid device adapted to be removably secured directly to a vehicle tire and comprising an intermediate longitudinally elastic portion stretchable across the tire tread, and provided at its ends with means for biting into the tire on opposite sides of its tread.

2. An anti-skid device adapted to be removably secured directly to a vehicle tire and comprising an intermediate longitudinally elastic portion stretchable across the tire tread, and provided at its ends with toothed means for biting into the tire on opposite sides of its tread.

3. An anti-skid device for tires comprising a resilient bar developed into a looped portion adapted to be stretched across the tire tread, said looped portion having end portions terminating in inwardly directed ends for biting into the tire on opposite sides of its tread.

4. An anti-skid device for tires comprising a resilient bar developed into a looped portion adapted to be stretched across the tire tread, said looped portion having inclined end portions terminating in inwardly directed ends for biting into the tire on opposite sides of its tread.

5. An anti-skid device for tires comprising a resilient bar developed into a looped portion adapted to be stretched across the tire tread, said looped portion having end portions terminating in inwardly directed toothed ends for biting into the tire on opposite sides of its tread.

6. An anti-skid device for tires comprising a resilient bar developed into a looped portion adapted to be stretched across the tire tread, said looped portion having inclined end portions terminating in inwardly directed toothed ends for biting into the tire on opposite sides of its tread.

7. An anti-skid device for tires comprising a resilient bar developed into a looped portion adapted to be stretched across the tire tread, said looped portion having inclined end portions terminating in inwardly directed widened ends for biting into the tire on opposite sides of its tread.

8. An anti-skid device for tires comprising a resilient bar developed into a looped portion adapted to be stretched across the tire tread, said looped portion having inclined end portions terminating in inwardly directed widened ends provided with teeth for biting into the tire on opposite sides of its tread.

9. An anti-skid device for tires comprising a resilient bar developed into a looped portion adapted to be stretched across the tire tread, said looped portion having inclined end portions terminating in inwardly directed ends for biting into the tire on opposite sides of its tread, said looped portion having recesses formed along one of its edges.

10. An anti-skid device for tires comprising a resilient bar developed into a looped portion adapted to be stretched across the tire tread, said looped portion having inclined end portions terminating in inwardly directed ends for biting into the tire on opposite sides of its tread, said looped portion having recesses formed along its outer or traction edge.

11. An anti-skid device for tires comprising a resilient bar developed into a looped portion adapted to be stretched across the tire tread, said looped portion having inclined end portions terminating in inwardly directed ends for biting into the tire on opposite sides of its tread, said looped portion having recesses formed along its inner or tread engaging edge.

12. An anti-skid device for tires comprising a resilient flat bar developed into a looped portion adapted to be stretched across the tire tread, said looped portion having edgewise inclined end portions terminating in flatwise inwardly directed ends for biting into the tire on opposite sides of its tread.

JOSEPH A. MORRONE.

REFERENCES CITED

The following references are of record in the file of this patent:

UNITED STATES PATENTS

| Number | Name | Date |
| --- | --- | --- |
| 1,027,450 | Thompson | May 28, 1912 |
| 1,481,232 | Schwiesow | Jan. 15, 1924 |
| 1,941,935 | Erickson | Jan. 2, 1934 |

FOREIGN PATENTS

| Number | Country | Date |
| --- | --- | --- |
| 539,065 | Great Britain | Aug. 27, 1941 |
| 798,045 | France | May 8, 1936 |